(12) United States Patent
Greb et al.

(10) Patent No.: US 9,989,681 B2
(45) Date of Patent: Jun. 5, 2018

(54) FLUORESCENT DISPLAY

(71) Applicant: KURARAY EUROPE GMBH, Hattersheim (DE)

(72) Inventors: Marco Greb, Hattersheim (DE); Philipp Lellig, Hattersheim (DE); Uwe Keller, Hattersheim (DE)

(73) Assignee: KURARAY EUROPE GMBH, Hattersheim (DE)

( * ) Notice: Subject to any disclaimer, the term of this patent is extended or adjusted under 35 U.S.C. 154(b) by 220 days.

(21) Appl. No.: 14/688,057

(22) Filed: Apr. 16, 2015

(65) Prior Publication Data

US 2015/0323716 A1 Nov. 12, 2015

(30) Foreign Application Priority Data

May 7, 2014 (EP) .................................. 14167427

(51) Int. Cl.
*G02B 5/20* (2006.01)
*B32B 37/18* (2006.01)
(Continued)

(52) U.S. Cl.
CPC ........ *G02B 5/201* (2013.01); *B32B 17/10036* (2013.01); *B32B 17/1066* (2013.01);
(Continued)

(58) Field of Classification Search
CPC ........ G02B 5/201; G02B 5/208; G02B 27/01; G02B 2027/0118; G02B 2027/0112; B32B 17/10036; B32B 17/10568; B32B 17/1066; B32B 17/10669; B32B 17/10678; B32B 17/10761; B32B 37/18; B32B 2315/08; B32B 2605/006; B32B 17/10; B32B 17/10339; B60R 1/00; C08K 5/1345; C08K 5/0041; C08K 3/0033
(Continued)

(56) References Cited

U.S. PATENT DOCUMENTS 4,130,684 A 12/1978 Littell, Jr. et al.
6,232,022 B1 * 5/2001 Fujiike .................. G02B 5/201
347/107
(Continued)

FOREIGN PATENT DOCUMENTS

DE 10 2009 044 181 A1 4/2011
EP 2110237 A1 10/2009
(Continued)

OTHER PUBLICATIONS

European Search Report for EP Application No. 14167427.5 (no English Language), Date Completed Oct. 10, 2014, Total 5 pages.

*Primary Examiner* — Bumsuk Won
*Assistant Examiner* — Wen Huang
(74) *Attorney, Agent, or Firm* — Brooks Kushman P.C.

(57) ABSTRACT

Fluorescent displays are manufactured by lamination of at least one film A containing a polyvinyl acetal PA and, optionally, a plasticizer WA and at least one film B containing a polyvinyl acetal PB and at least one plasticizer WB between two glass panes, wherein prior to lamination, film A contains less than 22 wt. % plasticizer WA and contains 0.001 to 5 wt. % fluorophores, and film B contains at least 22 wt. % plasticizer WB and contains 0.005-5 wt. % UV absorber, each before lamination.

20 Claims, 3 Drawing Sheets

(51) Int. Cl.
*B60R 1/00* (2006.01)
*B32B 17/10* (2006.01)
*G02B 27/01* (2006.01)

(52) U.S. Cl.
CPC .. *B32B 17/10568* (2013.01); *B32B 17/10669* (2013.01); *B32B 17/10678* (2013.01); *B32B 17/10761* (2013.01); *B32B 37/18* (2013.01); *B60R 1/001* (2013.01); *G02B 5/208* (2013.01); *G02B 27/01* (2013.01); *B32B 2315/08* (2013.01); *B32B 2605/006* (2013.01)

(58) Field of Classification Search
USPC ......... 351/361; 359/361, 630; 428/325, 430, 428/412, 339, 215; 156/67; 362/84
See application file for complete search history.

(56) References Cited

U.S. PATENT DOCUMENTS

| | | | |
|---|---|---|---|
| 7,008,618 B1 | 3/2006 | Hessefort et al. | |
| 7,964,245 B2 | 6/2011 | Bonda et al. | |
| 8,722,195 B2 | 5/2014 | Labrot et al. | |
| 8,734,953 B2 | 5/2014 | Sablayrolles et al. | |
| 9,477,022 B2 * | 10/2016 | Laluet ........................ B60J 1/02 | |
| 2002/0120916 A1 | 8/2002 | Sninder, Jr. | |
| 2005/0195488 A1 * | 9/2005 | McCabe ................. B60R 1/088 | 359/603 |
| 2011/0073773 A1 | 3/2011 | Labrot et al. | |
| 2012/0164409 A1 * | 6/2012 | Masaki ................... B32B 17/10 | 428/203 |
| 2013/0022824 A1 * | 1/2013 | Meise ............... B32B 17/10036 | 428/441 |
| 2013/0050983 A1 * | 2/2013 | Labrot .................... B32B 17/10 | 362/84 |
| 2013/0189527 A1 * | 7/2013 | Meise ............... B32B 17/10036 | 428/441 |
| 2013/0202863 A1 | 8/2013 | Shimamoto et al. | |
| 2014/0284590 A1 * | 9/2014 | Nakazawa ............ G02B 5/201 | 257/40 |

FOREIGN PATENT DOCUMENTS

| | | |
|---|---|---|
| EP | 2409833 A1 | 1/2012 |
| WO | 2008/132368 A2 | 11/2008 |
| WO | 2012072950 A1 | 6/2012 |

* cited by examiner side 2 side 1
(sunlight)

side 4 (toward the excitation source and observer)

side 3

Film layer a originating from the low-plasticizer film A and containing fluorophore with a low migration tendency Film layer B originating from the plasticizer-containing film B containing UV-absorber

FLUORESCENT DISPLAY

CROSS-REFERENCE TO RELATED APPLICATIONS

This application claims priority to European Patent Application No. EP 14167427.5 filed May 7, 2014 the disclosure of which is incorporated in its entirety by reference herein.

BACKGROUND OF THE INVENTION

1. Field of the Invention

The present invention relates to fluorescent displays manufactured using a film with a low plasticizer content made of polyvinyl acetal and a plasticizer-containing film made of polyvinyl acetal.

2. Background Art

In order to mirror information into the driver's visual field, so-called "heads-up displays" (HUDs) are currently used in passenger vehicles. For this purpose, an image is projected from a projector unit located in the dashboard support to the windshield (WS) that can be seen as a virtual image from the driver's seat. The effect is based on the reflection effect of the glass surface oriented toward the passenger compartment and the glass surface oriented toward the vehicle exterior. The inner glass surfaces contribute almost nothing to the reflection, since they, with their legally prescribed compound safety glass, are adhered to a PVB film located between the layers of glass which has a similar refractive index similar to glass.

In order to simplify references to the four glass surfaces of a conventionally structured windshield, the following convention is used which is shown in FIG. 1:

Side 1: outer surface of the pane of the composite body oriented toward the vehicle exterior;

Side 2: inner surface of the outer pane in the composite body oriented toward the intermediate layer film;

Side 3: inner surface of the inner pane in the composite body oriented toward the intermediate layer film;

Side 4: surface of the inner pane of the composite body oriented toward the vehicle interior.

In general, a film made of a plasticized polyvinyl butyral, abbreviated as "PVB film," is used as the intermediate layer film.

In order to eliminate double images in conventional HUDs with the described functional principle, the glass surfaces associated with sides 1 and 4 must be at a certain angle with respect to each other. This is achieved through the use of PVB films with a wedge-shaped thickness profile. However, such films are difficult to work with and tedious to manufacture, which makes them substantially more expensive than non-wedge-shaped film counterparts.

Other drawbacks of conventional HUDs include the fact that the information can only be viewed in a limited field of vision directly in front of the driver and is also only visible to the driver. There are many situations, however, in which information is to also be visible to passengers or displayed at another location of the windshield. For example, it is conceivable to project safety-relevant information directly onto the windshield, such as the contour of obstacles located in or next to driving surface such as those already detected in current automobiles by means of night vision systems. In a conventional HUD, the image is distorted by raindrops on the windshield, because the refractive index transition between glass and air underlying the optimized system configuration is distorted.

As an alternative to these conventional HUDs, it has already been proposed to generate images by means of fluorescing materials arranged in the windshield and the targeted excitation thereof (so-called "fluorescent HUD"). The excitation of these materials is done by means of UV radiation invisible to the human eye, whereby real images visible not only to the driver can be generated on the plane of the windshield. Appropriate organic dyes, inorganic particles, etc., have been proposed as fluorescing materials.

For the manufacture of fluorescent HUDs, it is known to apply fluorescing pigments or dyes in the form of coatings, laminated films or the like to side 4 of the windshield. Alternatively, it has been proposed to position fluorophore-containing films between side 3 and the PVB intermediate layer or to print the surface of the PVB film oriented toward side 3 with fluorophores.

WO 2012/072950A1 discloses printing a plasticizer-containing PVB film with certain low-molecular fluorophores such that they are distributed evenly in the film during the autoclaving process. The fluorophores are intended to act simultaneously as UV absorbers. In this respect, WO 2012/072950A1 describes the use of low-molecular hydroxyterephthalate esters, particularly 2,5-dihydroxydiethylterephthalate, as fluorophores and antioxidants that are applied to a PVB film. The fluorophore is distributed in the PVB film and can either act as a UV absorber itself or be mixed with a low-molecular UV-absorber present in the film.

It is known from WO2008132368 A9 that fluorescent HUDs can contain one or more inorganic luminophore particle-containing layers in thicknesses of less than 20 μm on side 3 of a composite body in addition to a conventional plasticizer-containing PVB film. However, there is the possibility here of uncontrolled excitation occurring as a result from sunlight from the outside, since conventional plasticizer-containing PVB films usually have a residual transmission for UV radiation. Moreover, care must be taken that no unsuitably large particles are included that could lead to scattering of light. The small layer thickness of the luminophore-containing layers of 20 μm limits the quantity of fluorophores that can be used, since greater concentrations lead to cloudiness. Consequently, the maximum achievable intensity of the fluorescent emission is limited.

US 2002/0120916 A1 describes head-up displays with fluorescent dyes in which the side facing toward the observer contains a UV absorber. This is intended to prevent excitation radiation for the fluorescent dyes to radiate through the display to the outside. For this purpose, US 20110073773 A1 discloses fluorescent displays having an opaque material on the side of the display facing away from the observer. EP 2409833 describes a fluorescent display in which the fluorescent dyes on the side facing toward the sunlight.

Several of the proposed solutions according to the prior art have the additional drawback that it is necessary to work with several different films, not all of which can be adhered in a trouble-free manner to a glass surface. For example, while a sufficiently thin PET film can be printed with a fluorescent dye and such a dye can also possibly be mixed directly in the PET, PET is not inherently adhesive to glass surfaces, so there is the need to work with additional adhesion-promoting layers. Obviously, such a thin PET film would then have to be embedded between two PVB films. But this increases the costs, the propensity to defects and an increased effort in the manufacture of corresponding glass laminates. What is more, PET is substantially stiffer than conventional plasticizer-containing PVB films and therefore forms waves and folds in combination with curved glasses. The excessive stiffness of PET also remains in contact with plasticizer-containing films when undergoing a laminating process typical for the manufacture of composite safety glass, since PET is not capable of absorbing plasticizers, thus becoming more flexible.

SUMMARY OF THE INVENTION

It was therefore the object to provide intermediate layer films for the manufacture of fluorescent displays which possess a simpler construction than the known films but in which the fluorophores are protected from uncontrolled sunlight excitation. In the framework of the invention, the abovementioned convention shown in FIG. 1 for designating the surfaces of a glass/glass laminate is also used in fluorescent displays made of glass/glass laminates for other areas of application, such as display units for use in the fields of construction and advertising, etc., for example. In that case, side 4 then refers to the side facing toward the source of the excitation radiation.

DETAILED DESCRIPTION OF THE PREFERRED EMBODIMENT(S)

The subject matter of the present invention is therefore a fluorescent display, manufactured through lamination of at least one film A containing a polyvinyl acetal PA and, optionally, at least one plasticizer WA and at least one film B containing a polyvinyl acetal PB and at least one plasticizer WB between two glass panes, with film A having less than 22 wt. % plasticizer WA and 0.001 to 5 wt. % fluorophores and film B having at least 22 wt. % plasticizer WB and 0.005-5 wt. % UV absorber, each before lamination.

According to the invention, the intermediate layer B resting against side 2 of the fluorescent display has a high light transmission and simultaneously a low UV transmission. In this way, the following effects are achieved: protection of the fluorophores arranged behind it from fading, prevention of UV radiation from leaving the excitation source, prevention of uncontrolled excitation by the UV component by solar radiation and ensuring the usually-required low UV transmission for the entire component.

The film B resting against glass surface 2 therefore has a UV transmission $T_{UV}(400)$ when measured in the composite between 2×2.1 mm clear glass according to ISO 13837, Convention "A" (2008) of, in order of increasing preference, less than 30%, less than 20%, less than 15%, less than 8%, less than 6%, less than 5%, less than 4%, less than 3% and most preferably less than 2%. In addition, the film B resting against glass surface 2 has a UV transmission $T_{UV}$ when measured in the composite between 2×2.1 mm clear glass and absorption of a UV/VIS transmission spectrum according to ISO 13837 (2008), in order of increasing preference, of no more than 50%, no more than 30%, no more than 15%, no more than 10%, no more than 5%, no more than 3%, no more than 2% and most preferably no more than 1%.

Figure 1:
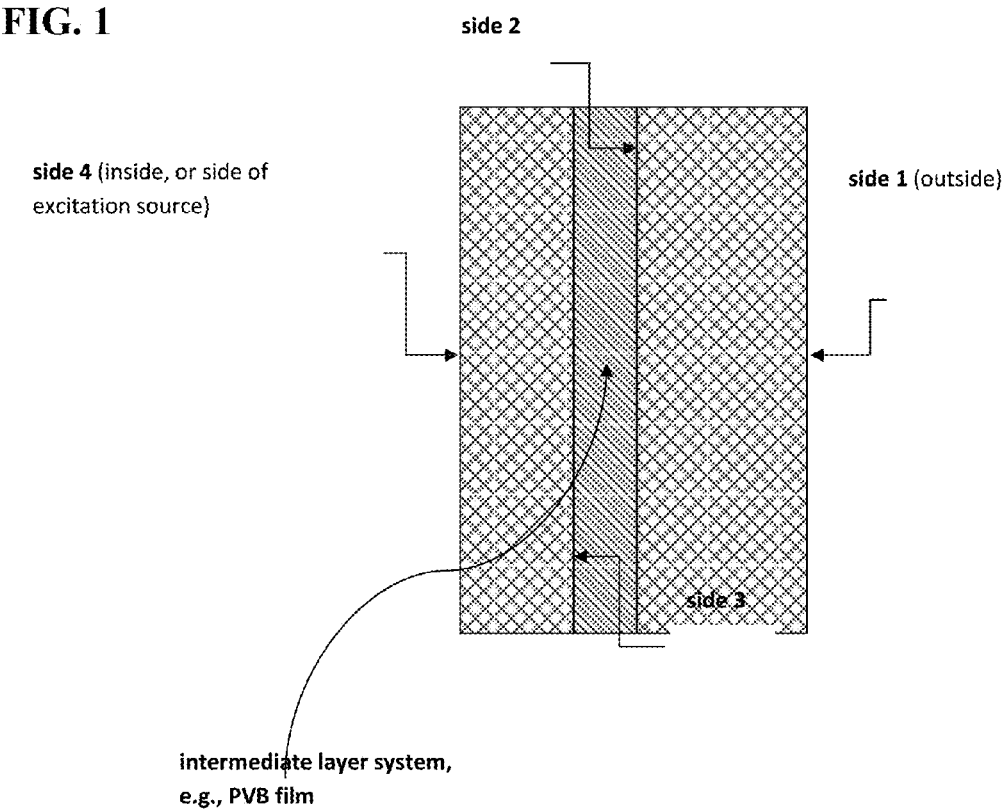
FIG. 1 identifies the various surfaces of glass laminated in the description of the present invention.
Figure 2:
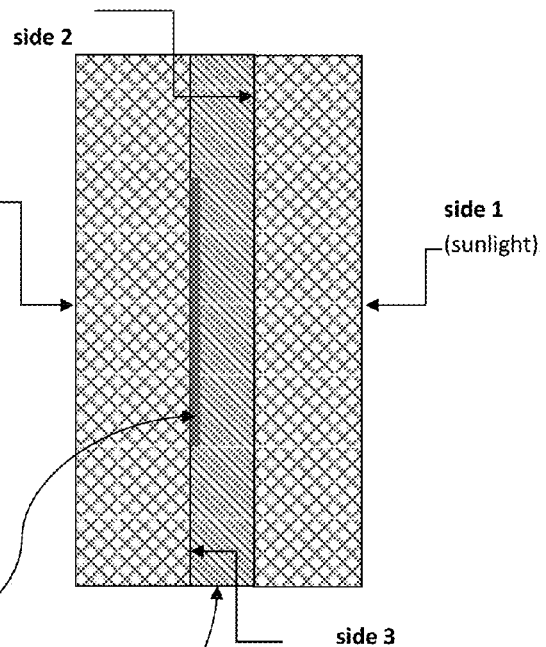
FIG. 2 illustrates one embodiment of the present invention.

The fundamental arrangement of the layers or films A and B is shown schematically in FIG. 2. Here, a fluorescent display according to the invention is shown with a side 1 facing toward the sunlight and a side 4 facing toward the excitation radiation. The intermediate layer B or the plasticizer-containing film B contains UV absorber and the intermediate layer A or low-plasticizer film A contains the fluorophores.

In the following, the "initial state" is understood as being the state of films A and B before lamination, i.e., in the still-separated state.

The films A and B can contain a single plasticizer or a mixture of plasticizers both of different or the same composition in the initial state before the lamination of the layers and in the stack of intermediate layers located in the fluorescent display. "Different composition" refers to both the type of the plasticizers and their proportion in the mixture. Preferably, film A and film B have the same plasticizers WA and WB after lamination, i.e., in the finished fluorescent display. In a preferred variant, however, film A does not contain any plasticizer in its initial state and contains the plasticizer WB after lamination.

In the initial state before the lamination of the layers, plasticizer-containing films B used according to the invention contain at least 22 wt. %, such as 22.1-36.0 wt. %, preferably 24.0-32.0 wt. % and particularly 26.0-30.0 wt. % plasticizer.

In the initial state before the lamination of the layers, plasticizer-containing films B used according to the invention can contain less than 22 (such as 21.9) wt. %, and in order of increasing preference, less than 20 wt. %, less than 18 wt. %, less than 16 wt. %, less than 14 wt. %, less than 12 wt. %, less than 8 wt. %, less than 6 wt. %, less than 4 wt. %, less than 3 wt. %, less than 2 wt. %, and less than 1 wt. %, or no plasticizer at all (0.0 wt. %). Preferably, the low-plasticizer films A contain 0.0-8 wt. % plasticizer.

According to the invention, one or more of the following plasticizers known for PVB film can be used as plasticizer WA, WB or WC: di-2-ethylhexyl sebacate (DOS), di-2-ethylhexyl adipate (DOA), dihexyl adipate (DHA), dibutyl sebacate (DBS), triethylene glycol-bis-n-heptanoate (3G7), Tetraethylene glycol-bis-n-heptanoate (4G7), triethylene glycol-bis-2-ethylhexanoate (3GO or 3G8) tetraethylene glycol-bis-n-2-ethylhexanoate (4GO or 4G8), di-2-butoxyethyl adipate (DBEA), di-2-butoxyethoxyethyl adipate (DBEEA), di-2-butoxyethyl sebacate (DBES), di-2-ethylhexylphthalate (DOP), di-isononylphthalate (DINP), triethylene glycol-bis-isononanoate, triethylene glycol-bis-2-propylhexanoate, 1,2-cyclohexane dicarboxylic acid diisononyl ester (DINCH), Tris(2-ethylhexyl)phosphate (TOF) and dipropylene glycol benzoate.

In the method according to the invention, in the initial state before the lamination of the layers, film A has a thickness of no more than 20%, preferably 15% and preferably no more than 10% of the thickness of the film or films B.

The thickness of a film A in the initial state before the lamination of the layers is 10-150 μm, preferably 20-120 μm, more preferably 30-100 μm, yet more preferably 40-80 μm and most preferably 50-70 μm. In the laminate, the thickness of film A increases through migration of plasticizer from film B.

Film A is manufactured separately from film B, e.g., it is extruded and usually has no plasticizer at all or a small plasticizer content, so that it does not expand excessively during manufacture and further processing under mechanical load and is not too tacky.

In the initial state, the thickness of a film B is 450-2500 µm, preferably 600-1000 µm, and more preferably 700-900 µm. When using several films B, the same applies accordingly to the overall thickness. If films B are stretched and/or additionally adapted to the shape of a pane (e.g., windshield) before the laminate is produced, the indicated thicknesses can be reduced again by up to 20% at the time of lamination.

At least one fluorophore-containing film A can be oriented toward a glass surface of the fluorescent display according to the invention.

Alternatively, film A can also be used such that it is embedded between two or more plasticizer-containing films and does not rest directly against any of the glass surfaces in this case. In this way, in fluorescent displays according to the invention, a film A can be arranged between a film B and a film C containing a polyvinyl acetal PC and at least 22 wt. % of at least one plasticizer WC.

Film C can have the same or a different UV absorber as film B in the respective same or smaller quantity.

Preferably, film C does not have any UV absorber, or has a UV absorber that does not absorb at the excitation wavelength of the fluorophore.

The polyvinyl acetal PC can be different from or identical to polyvinyl acetal PB. Plasticizer WC can be different from or identical to plasticizers WB or WA. In the simplest of cases, film B and film C have the same composition in relation to polyvinyl acetal and plasticizer.

Figure 3:
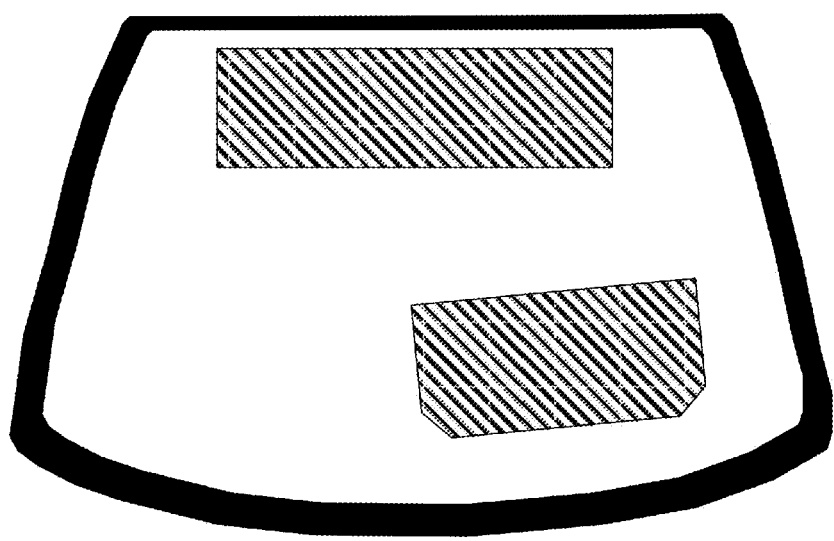
FIG. 3 illustrates a further embodiment of the present invention.

The intermediate layer A can have the same surface as intermediate layer B in the laminate, or a smaller surface. Particularly, however, the intermediate layer A can also be arranged only in areas of the laminate in which images or information fluorescing by means of excitation by UC radiation are to be displayed. Such an arrangement is shown in FIG. 3.

The low-plasticizer fluorophore-containing film A can be trimmed and positioned such that it does not reach to the edge of the laminate throughout the laminate. In particular, the film A can be smaller in the edge area by at least 1 mm than at least one glass pane, so that the film B is in direct contact with at least one glass pane in this edge area.

Preferably, however, the film A is installed in only one or more sub-areas of a display according to the invention and, in this case, takes up a smaller surface than the total glass surface. Preferably, the thin fluorophore-containing films A are arranged in those sub-areas of the display according to the invention in which information is to be displaced through fluorescence by UV light projected there.

Moreover, the film A, which has a low plasticizer content or is plasticizer-free in the initial state can be perforated before placement into the film sandwich, so that it can have recesses such as openings, holes or slots in any geometric pattern.

In this way, the film A can have at least one opening, so that the film B is in direct contact with at least one glass pane through this opening. After adhesion into the finished display, the film B, which has a higher plasticizer content in the initial state, is adhered to the glass panes in these areas without interruption. In particular, openings in areas of the fluorescent display can be obtained behind which the function of sensors, or optical or antenna elements would otherwise be impaired.

UV Absorber

In the initial state, film B contains a UV absorber in a quantity of 0.005-5 wt. %, preferably 0.1 to 2 wt. %, more preferably 0.2-1.0 wt. % and most preferably 0.1-0.8 wt. %, each with respect to the weight of the layer in which the UV absorbers are originally contained.

Low-molecular weight UV absorbers or UV absorbers with a low tendency to migrate or diffuse that are known for plasticizer-containing polyvinyl acetal films can be used as UV absorbers. In one exemplary application of the fluorescent display as a windshield of a motor vehicle, this arrangement makes it possible to have the fluorophores be excited by UV radiation from the passenger compartment or from side 4 of a display unit without the radiation actually provided for excitation already being absorbed by the UV absorber.

In film B For example, compounds of the benzotriazole type such as, for instance, Tinuvin P, Tinuvin 328, Tinuvin 326, Tinuvin 327 or substituted phenyltriazines Tinuvin 1577 or Cyasorb 1164 can be used as low-molecular weight (conventional) UV absorbers with high diffusivity. During the lamination process or even thereafter, these compounds can transition through diffusion into the intermediate layer A originating from film A but not completely extinguish the fluorescence there, since sufficient UV intensity remains directly behind the glass surface.

Examples of substances that can be used as UV absorbers of film B with no or only low diffusivity are nanoparticles such as nano-$TiO_2$, UV-absorbing polymers, UV absorbers that are poorly soluble in the present matrix of plasticizer and polyvinyl acetal, e.g., of the benzoxazinone type, the weakly substituted diphenyl hydroxyphenyltriazine type, UV absorbers containing ionic groups, UV absorbers chemically linked to the polyvinyl acetal, e.g., those based on benzotriazole, polymer-bound crylene or alkoxycrylene groups, particularly those with an alkoxy group in one of the phenyl rings such as those disclosed in U.S. Pat. No. 7,964,245 B2, for example, UV-absorbing polymers such as those cited in U.S. Pat. No. 7,008,618 B1, or substituted 2-hydroxyphenyl benzotriazoles that are linked, for example, by an ester group to a polymer, particularly to a polyvinyl acetal.

Within the framework of the present invention, UV absorbers regarded as being poorly soluble have, at 20° C., a solubility of less than 5 g/L in the plasticizer/polyvinyl acetal matrix of the film B. One example of this is Cyasorb UV 3638F.

UV absorbers with a low tendency to migrate or diffuse are, in particular: polymeric UV absorbers such as, for example, Polyacrylene S1 by Hallstar, UV absorbers with ionic groups, UV-absorbing nanoparticles, or organic UV absorbers present as particles in the film matrix.

UV absorbers having a low tendency to migrate are particularly those selected from among the compounds of formulas (1a), (1b), (2) or (3).

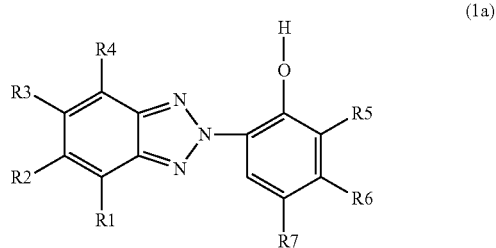

(1a)

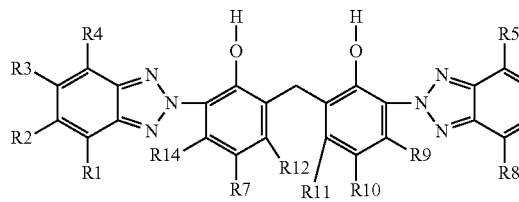

(1b)

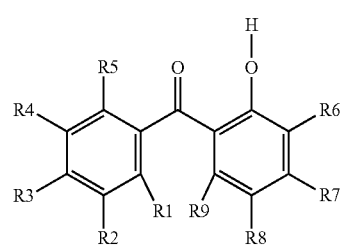

(2)

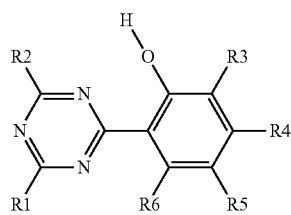

(3)

where R1, R2, R3, R4, R5, R6, R7, R8, R9, R10, R11, R12, R13,
R14=H, halogen, alkyl, hydroxyalkyl, alkoxyalkyl, acyloxyalkyl group with 1 to 20 carbon atoms, each unsubstituted or substituted by aldehyde, keto or epoxide groups, on the condition that at least one of the groups R1, R2, R3, R4, R5, R6, R7, R8, R9, R10, R11, R12, R13, R14 bears a carboxy, sulfoxy or phosphate group with an alkali, alkaline earth or ammonium ion as a counterion.

Preferably, UV absorbers of formula 4 are used which are derived from UV absorbers of the 2-hydroxybenzotriazole type:

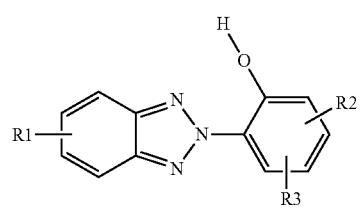

(4)

where R1, R2 and R3 have the abovementioned meanings

Especially preferably, UV absorbers according to formula 5 are used,

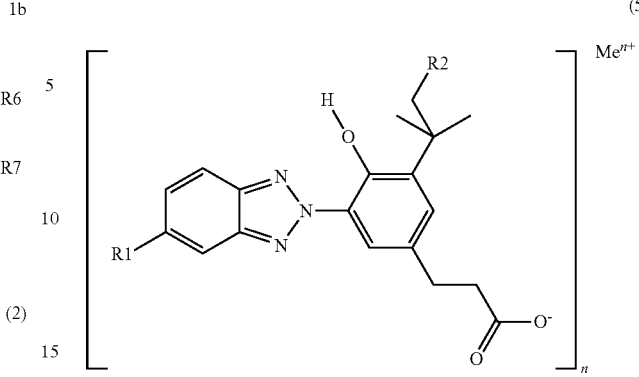

(5)

where R1=H or halogen, R2=H or CH$_3$, and Me$^{n+}$=Li$^+$, Na$^+$, K$^+$, Mg$^{2+}$, Ca$^{2+}$, Zn$^{2+}$, or NH$_4^+$.

Most preferably, films according to the invention contain a UV absorber in the form of an alkali, alkaline earth or ammonium salt derived from the compound 3-(2H-benzotriazol-2-yl)-5-(1,1-dimethyl)-4-hydroxybenzol propanoic acid, CAS no. 84268-36-0 or the compound 3-(5-chloro-2H-benzotriazole-2-yl)-5-(1,1-dimethyl)-4-hydroxybenzol-propanoic acid, CAS no. 83573-67-5.

These UV absorber acids are commercially available, for example, from Everlight under the trade names Eversorb R01 and Eversorb R04.

Fluorophores

The excitation of the fluorophores used according to the invention is preferably done through radiation in the non-visible range of light, such as in the wavelength range of 300-420 nm, preferably in the wavelength range of 350-400 nm and most preferably in the wavelength range of 365-385 nm. UV lasers or UV-LEDs can particularly be used as a radiation source.

The film A contains one or more fluorophores, which preferably do not migrate or diffuse or only do so minimally. In one exemplary application of the fluorescent display as a windshield of a motor vehicle, this arrangement makes it possible to prevent the fluorophores from migrating from side 4 of a display unit to side 2 and being undesirably excited there by sunlight.

The following can be used in film A as fluorophores with no or only little diffusivity: fluorescing inorganic nanoparticles, fluorescent dyes that are poorly soluble in the surrounding matrix, such as substituted perylenes or rylenes or derivatives of quinacridone, fluorescent dyes with ionic groups such as Tinopal CBS-X or of an ionic nature such as uranine, as well as polymeric fluorophores.

The following fluorophores and the alkali or alkaline earth salts thereof are especially suitable as fluorophores with low diffusivity:

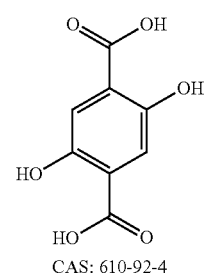

CAS: 610-92-4

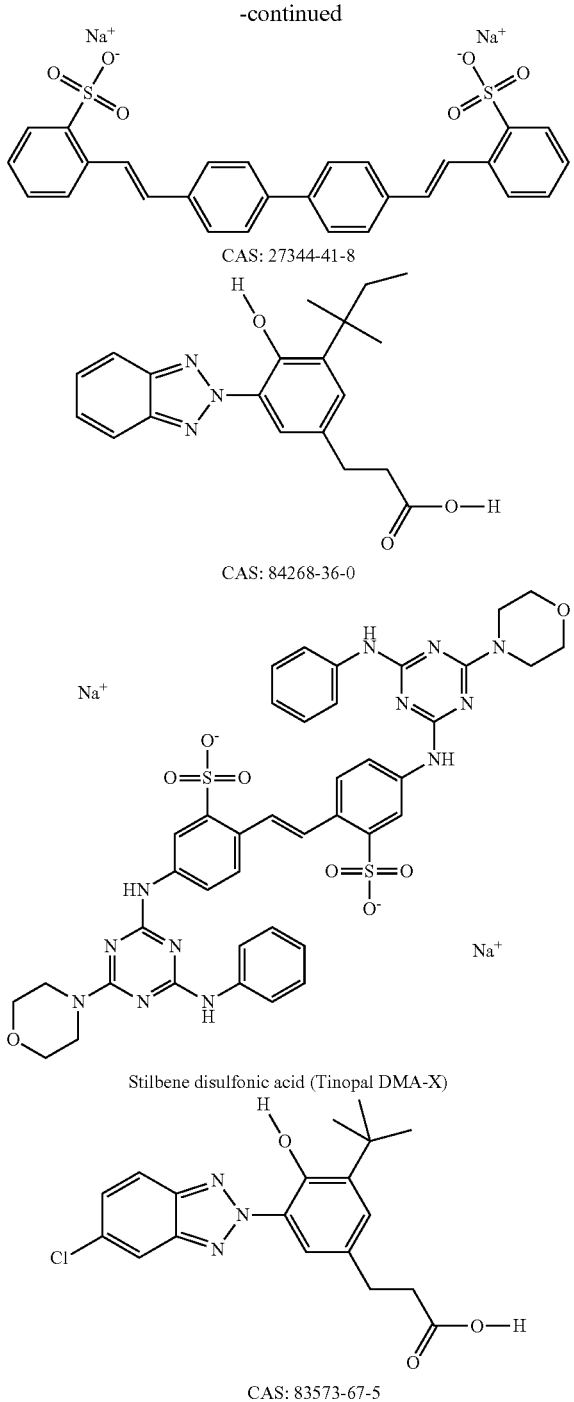

CAS: 27344-41-8

CAS: 84268-36-0

Stilbene disulfonic acid (Tinopal DMA-X)

CAS: 83573-67-5

Fluorescing polymers which contain light-emitting units within the polymer chain or on a polymer chain can be used as polymeric fluorophores. In order to keep the diffusivity of such a polymer in the surrounding matrix to a minimum, fluorescing polymers that can be used according to the invention should preferably have a molecular weight Mn of more than 2000, preferably more than 5000 and most preferably more than 10,000 g/mol.

The local concentration of fluorescing polymers in and on the surrounding matrix is selected such that a high level of fluorescence is achieved and no pronounced fluorescence quenching occurs.

Examples of fluorescing polymers that can be used in the framework of the invention are, among many others: poly(9-anthracenylmethyl acrylate), poly(9-anthracenylmethyl methacrylate), poly(3,3',4,4'-benzophenonetetracarboxylic dianhydride-alt-acridine yellow G), poly(3,3',4,4'-benzophenonetetracarboxylic dianhydride-alt-3,6-diaminoacridine hemisulfate), poly(fluorescein O-acrylate), poly(fluorescein O-methacrylate), poly[(methyl methacrylate)-co-(7-(4-trifluoromethyl)coumarin acrylamide)], poly[(methyl methacrylate)-co-(9-anthracenylmethyl methacrylate)], poly[(methyl methacrylate)-co-(7-(4-trifluoromethyl)coumarin methacrylamide)], poly(pyromellitic dianhydrid-alt-acridine yellow G), poly(1,4-phenylene) (PPP), polyfluorene (PFO), poly(thiophene), polyquinoline, poly[2,5-bis(3',7'-dimethyloctyloxy)-1,4-phenylenevinylene], poly[9,9-bis-(2-ethylhexyl)-9H-fluorene-2,7-diyl], poly[2-(2',5'-bis(2'-ethylhexyloxy)phenyl)-1,4-phenylenevinylene], poly {[2-[2',5'-bis(2''-ethylhexyloxy)phenyl]-1,4-phenylenevinylene]-co-[2-methoxy-5-(2'-ethylhexyloxy)-1,4-phenylenevinylene]}, poly[2,5-bisoctyloxy)-1,4-phenylenevinylene], poly(2,5-bis(1,4,7,10-tetraoxaundecyl)-1,4-phenylenevinylene), poly(3-cyclohexylthiophene-2,5-diyl), poly(9,9-di-n-dodecylfluorenyl-2,7-diyl), poly[(9,9-dihexylfluorene-2,7-diyl)-co-(anthracene-9,10-diyl)], poly[(9,9-dihexylfluorene-2,7-diyl)-alt-(2,5-dimethyl-1,4-phenylene)], poly(9,9-n-dihexyl-2,7-fluorene-alt-9-phenyl-3,6-carbazol), poly[(9,9-dihexylfluorene-2,7-diyl)-co-(9-ethylcarbazol-2,7-diyl)], poly(2,5-dihexyloxy-1,4-phenylenevinylene), poly(9,9-di-n-octylfluorenyl-2,7-diyl), poly(3-octylthiophene-2,5-diyl), poly(3-octylthiophene-2,5-diyl), poly[(o-phenylenevinylene)-alt-(2-methoxy-5-(2-ethylhexyloxy)-p-phenylenevinylene)], poly[tris(2,5-bis(hexyloxy)-1,4-phenylenevinylene)-alt-(1,3-phenylenevinylene)], and poly[(1,4-phenylene-1,2-diphenylvinylene)], polyquinoline.

Embodiments of the Fluorescent Displays

The fluorescent display according to the invention can also contain fluorophores only in sub-areas of the layers, which leads to a fluorescing strip instead of the color wedge/color band otherwise commonplace in windshields. It is also possible to arrange film A behind the area in which a pigmented color wedge of film is located in the laminate.

During the manufacture of the low-plasticizer film A, the fluorophore or fluorophores can be introduced therein, for example in an extrusion process.

Alternatively, application to one or both surfaces of film A is also possible. Particularly worthy of consideration for this purpose are, in principle, all suitable coating, printing, transfer, spray processes, etc. In this way, the fluorophore can be applied in a high local concentration on side 3 and remain at the immediately adjacent Boundary surface. While the film layer lying behind it contains a UV absorber that is capable of migrating, it cannot migrate in front of the fluorophores at a level with a very high extinction effect. The other great advantage of this embodiment is that, due to its low level of plasticizer, film A has good tensile strength, is easy to handle and can be positioned easily on a glass surface despite the small thickness. After placement of a plasticizer-containing film B and production of a pre-composite and final composite, a fluorescent display is obtained in a simple manner which has the fluorescing function either over the entire surface or only in the desired area.

The surface-coating with fluorophores can be done over the entire surface or in the form of patterns or symbols, e.g., letters or warning symbols.

The films A and B used according to the invention can have the following additional ingredients:

a) An alkali titer in the ranges 0-50, 0-40, 0-35, or 5-35. As a result, the break-down of the fluorophores by free acid or high alkalinity is avoided.
b) Light stabilizers for the suppression of radical chain reactions, such as of the type HAS/HALS/NOR-HALS (sterically hindered amino ethers)
c) Phenolic antioxidants, such as BHT of the Lowinox 44B25 or Irganox 245 types.

In particular, the stabilizers identified under b) and c) can pass during the lamination process or thereafter from the plasticizer-containing film B into the film layer A originating from film A and contribute there to improving the stability of the fluorophores.

Light stabilizers are preferably sterically hindered amines of the type HAS/HALS/NOR-HALS (sterically hindered amino ethers such as the commercially available products Tinuvin 123 (NOR-HALS), Tinuvin 144, Tinuvin 622, Tinuvin 770 and its di-N-methylated derivative, by Ciba Specialities. ADK Stab LA-57, LA-52 or LA-62 by Asahi Denka Co. or UVINUL 4050 H by BASF AG.

Light stabilizers are particularly used in a proportion of 0.001 to 1 wt. % (with respect to the film mixture).

In addition, film B can d) consist of at least two sub-films B' and B" which optionally have a different plasticizer content. In this way, an acoustically attenuating layer is included, so that film B, during lamination between 2×2.1 mm glass and measurement according to ISO TS 16940 at 20° C., has a loss factor of the $1^{st}$ mode of more than 0.15, preferably more than 0.20, and most preferably more than 0.25. The acoustically attenuating layer can also consist of plasticizer-containing polyvinyl acetal;
e) have a so-called color band (band filter area) in the upper area. For this purpose, either the upper part of the film can be coextruded with a commensurately colored polymer melt or one of the sub-films can have a different color in a multilayer system. In the present invention, this can also be achieved through complete or partial coloration of at least one sub-film B.
f) a wedge-shaped thickness profile for generating a conventional HUD function.

The invention further relates to the use of the fluorescent displays according to the invention made of glass/glass laminates using an intermediate layer film with the cited characteristics and/or compositions, as an automobile windshield, automobile side glass, glass for aircraft, trains or ships and for applications in the area of construction such as display windows, elevators or façade glass. For this latter purpose, side 4 of the glass/glass laminate can be provided in another variant with a surface (coating) that has an antireflective effect in a wavelength range from 280-420 nm for this purpose.

In another variant, in this glass/glass laminate for simplified transmission, the inside glass pane can have a smaller thickness than the outer glass pane. For automotive applications, the outer pane preferably has a thickness of less than/equal to 3 mm, more preferably less than 2.6 mm, and most preferably less than 2 mm. The associated inner pane preferably has a thickness of less than or equal to 2.6 mm, 2.2 mm, 2.0 mm, 1.8 mm, 1.6 mm.

The invention further relates to an automobile interior with a windshield having a fluorescent display according to the invention made of glass/glass laminates using an intermediate layer film with the cited characteristics and/or compositions and side panes and optionally transparent roof module of or with UV-absorbing glass.

As a result, the fluorescent display in the windshield is protected against incident outside light and the loss in contrast or uncontrolled excitation associated therewith. The UV-absorbing glass can be, for example, a UV-absorbing monolithic glass or a composite glass with a usual UV absorber-containing PVB film. Preferably, the abovementioned UV-absorbing glass has a UV transmission of less than 10% and preferably less than 4% according to the evaluation and measurement per ISO 13837, Convention "A" (2008).

The manufacture of the films A and B used according to the invention is generally performed through extrusion or coextrusion under conditions of melt pressure, melt temperature and tool temperature, yielding a melt fracture surface, i.e., a stochastic surface roughness.

In addition, a regular, non-stochastic roughness can be embossed on an already manufactured film A or B by means of an embossing process between at least one pair of rollers. Embossed films generally exhibit improved ventilation behavior during lamination and are preferably used in the automobile industry.

Fluorescent displays, are manufactured through lamination of at least one film A containing a polyvinyl acetal PA and, optionally, a plasticizer WA and at least one film B containing a polyvinyl acetal PB and at least one plasticizer WB between two glass panes, wherein film A has less than 22 wt. % plasticizer WA and 0.001 to 5 wt. % fluorophores and film B has at least 22 wt. % plasticizer WB and 0.005-5 wt. % UV absorber, each before lamination.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A transparent fluorescent display, comprising a laminate between two glass panes, at least one film A of the laminate containing a polyvinyl acetal PA and, optionally, at least one plasticizer WA, and at least one film B of the laminate containing a polyvinyl acetal PB and at least one plasticizer WB wherein prior to lamination, film A has less than 22 wt. % plasticizer WA and 0.001 to 5 wt. % fluorophores and film B has at least 22 wt. % plasticizer WB and 0.005 -5 wt. % UV absorber, and wherein in the display, film A and film B are in direct contact with each other.

2. The fluorescent display of claim 1, wherein film A contains a fluorophore with a low diffusivity into film B.

3. The fluorescent display of claim 1, wherein film B contains UV absorber with a low diffusivity into film A.

4. The fluorescent display of claim 2, wherein film B contains UV absorber with a low diffusivity into film A.

5. The fluorescent display of claim 1, wherein film A is arranged between a film B and a film C containing a polyvinyl acetal PC and at least 22 wt. % of at least one plasticizer WC.

6. The fluorescent display of claim 2, wherein film A is arranged between a film B and a film C containing a polyvinyl acetal PC and at least 22 wt. % of at least one plasticizer WC.

7. The fluorescent display of claim 3, wherein film A is arranged between a film B and a film C containing a polyvinyl acetal PC and at least 22 wt. % of at least one plasticizer WC.

8. The fluorescent display of claim 4, wherein film A is arranged between a film B and a film C containing a polyvinyl acetal PC and at least 22 wt. % of at least one plasticizer WC.

9. The fluorescent display of claim 5, wherein film C has no UV absorber or a UV absorber that does not absorb sufficiently at an excitation wavelength of the fluorophore which would prevent excitation of the fluorophore.

10. The fluorescent display of claim 1, wherein at least one of films A or B contain a light stabilizer for the suppression of radical chain reactions.

11. The fluorescent display of claim 1, wherein at least one of films A and/or B contain a phenolic antioxidant.

12. The fluorescent display of claim 1, wherein film A comprises a polyvinyl acetal PA with a content of vinyl alcohol groups of from 6 to 26 wt. % and film B comprises a polyvinyl acetal PB with a content of vinyl alcohol groups of from 14 to 26 wt. %.

13. The fluorescent display of claim 1, wherein film A is at least 1 mm smaller in an edge area than at least one glass pane, so that film B is in direct contact with at least one glass pane in this edge area.

14. The fluorescent display of claim 1, wherein film A has at least one opening, so that film B is in direct contact with at least one glass pane through this opening.

15. The fluorescent display of claim 1, wherein film B comprises at least two sub-films B' and B" having a different plasticizer content.

16. The fluorescent display of claim 1, wherein at least one film B has a wedge-shaped thickness profile.

17. A display system for automobile windshields, automobile side glass, glass for aircraft, trains or ships, and display windows, elevators or facade glass, comprising a fluorescent display of claim 1.

18. An automobile having a windshield containing a fluorescent display of claim 1, and a side pane of UV-absorbing glass.

19. A method for the manufacture of a fluorescent display of claim 1, comprising positioning film A on a glass pane, covering film A with at least one film B, and placing an assembly thus prepared on a second glass pane.

20. A transparent fluorescent display, comprising a laminate between two glass panes, at least one film A of the laminate containing a polyvinyl acetal PA and, optionally, at least one plasticizer WA, and at least one film B of the laminate containing a polyvinyl acetal PB and at least one plasticizer WB, wherein prior to lamination, film A has less than 22 wt. % plasticizer WA and 0.001 to 5 wt. % fluorophores, and film B has at least 22 wt. % plasticizer WB and 0.005-5 wt. % UV absorber, wherein in the display, film A and film B are in direct contact with each other, and wherein at least one UV absorber is a UV absorber which does not migrate or one having a low tendency to migrate into film A from film B, and is selected from the group consisting of polymeric UV absorbers, poorly soluble UV absorbers which have a solubility of less than 5 g/L in a combination of polyvinyl acetal PB and plasticizer WB, UV absorbers containing ionic groups, UV absorbers chemically bonded to polyvinylacetal, and nano-$TiO_2$, and/or wherein the fluorophores of film B do not migrate, or are fluorophores having a low tendency to migrate selected from the group consisting of fluorescing inorganic particles, substituted perylenes, rylenes, quinacridone derivatives, fluorescent dyes with ionic groups, and polymeric fluorophores.

* * * * *